US012630077B2

(12) United States Patent
Prat et al.

(10) Patent No.: US 12,630,077 B2
(45) Date of Patent: May 19, 2026

(54) METHOD FOR CONTROLLING DIRECTIONAL LIGHTING AND LIGHTING DEVICE IMPLEMENTING THIS METHOD

(71) Applicant: VALEO VISION, Bobigny (FR)

(72) Inventors: Constantin Prat, Bobigny (FR); Arthur Lubat, Bobigny (FR)

(73) Assignee: Valeo Vision, Bobigny (FR)

( * ) Notice: Subject to any disclaimer, the term of this patent is extended or adjusted under 35 U.S.C. 154(b) by 165 days.

(21) Appl. No.: 18/719,060

(22) PCT Filed: Dec. 16, 2022

(86) PCT No.: PCT/EP2022/086447
§ 371 (c)(1),
(2) Date: Jun. 12, 2024

(87) PCT Pub. No.: WO2023/111309
PCT Pub. Date: Jun. 22, 2023

(65) Prior Publication Data
US 2025/0042328 A1 Feb. 6, 2025

(30) Foreign Application Priority Data
Dec. 17, 2021 (FR) ...................................... 2113925

(51) Int. Cl.
*B60Q 1/14* (2006.01)
*B60Q 1/04* (2006.01)

(52) U.S. Cl.
CPC .................................. *B60Q 1/1423* (2013.01)

(58) Field of Classification Search
CPC .. B60Q 1/085; B60Q 1/143; B60Q 2300/112; B60Q 2300/42; B60Q 1/1423;
(Continued)

(56) References Cited

U.S. PATENT DOCUMENTS

2016/0309553 A1 10/2016 Kuerschner et al.
2021/0112647 A1* 4/2021 Coleman ................. G01S 17/42
(Continued)

FOREIGN PATENT DOCUMENTS

DE 102013223711 A1 5/2015
EP 3672369 A1 6/2020
(Continued)

OTHER PUBLICATIONS

European Patent Office, International Search Report (with English translation) and Written Opinion of corresponding International Application No. PCT/EP2022/086447, dated Feb. 8, 2023.

*Primary Examiner* — Wei (Victor) Y Chan
(74) *Attorney, Agent, or Firm* — Valeo Vision

(57) ABSTRACT

The invention relates to a method for controlling bending light generated by a vehicle lighting device emitting a luminous flux that varies depending on the movement of the vehicle, the method includes determining at least three initial luminous-flux images, each initial luminous-flux image corresponding to emission of light by the lighting device in a predefined direction. When the vehicle is not following one of the predefined directions, determining an intermediate luminous-flux image to be emitted by the lighting device in an intermediate direction, by weighted averaging of two of the three initial luminous-flux images corresponding to the directions flanking the intermediate direction most closely and projecting, onto the road scene, depending on the direction of movement of the vehicle, the initial or intermediate luminous-flux image.

8 Claims, 4 Drawing Sheets

(58) Field of Classification Search
CPC .................. B60Q 2400/50; B60Q 1/04; B60Q
2300/054; B60Q 2300/122; B60Q
2300/134; B60Q 2300/322; B60Q
2300/41; B60Q 2300/45; B60Q 1/2607;
B60Q 2300/056; B60Q 2300/114; B60Q
2300/314; B60Q 2300/116; B60Q
2300/142; B60Q 2300/21
See application file for complete search history.

(56) References Cited

U.S. PATENT DOCUMENTS

| | | | | |
|---|---|---|---|---|
| 2021/0315074 A1* | 10/2021 | DeMayo | ................. | H05B 45/14 |
| 2022/0034469 A1* | 2/2022 | Mochizuki | ............ | F21S 41/365 |

FOREIGN PATENT DOCUMENTS

| | | | |
|---|---|---|---|
| FR | 2991251 | A1 | 12/2013 |
| FR | 3101692 | A1 | 4/2021 |
| FR | 3107751 | A1 | 9/2021 |

* cited by examiner

METHOD FOR CONTROLLING DIRECTIONAL LIGHTING AND LIGHTING DEVICE IMPLEMENTING THIS METHOD

TECHNICAL FIELD

The present invention relates to a method for controlling bending light, also known as directional lighting, emitted by a vehicle lighting device toward a road scene, in which the luminous-flux image is adapted to each direction of movement of the vehicle. The invention also relates to a vehicle lighting device employed by this method.

The invention is applicable to the field of lighting of road scenes by road vehicles, such as motor vehicles. It is in particular applicable to the field of bending light, where the lighting generated varies depending on the movement of the vehicle.

BACKGROUND OF THE INVENTION

For safety reasons, motor-vehicle lighting devices have undergone a lot of development in recent years in order to improve the visibility of the driver while complying with regulations in force. To improve the visibility of the driver, certain lighting devices, or headlamps, allow the light beam to be reconfigured depending on the speed of the vehicle, on weather conditions, on whether other vehicles are being passed, etc. Certain improvements have been made to FBL systems (FBL standing for Fixed Bending Light). Other improvements have been made to DBL systems (DBL standing for Dynamic Bending Light).

In DBL systems, the lighting devices follow the path of the automobile, for example in bends, in order to illuminate the road scene as best as possible for the driver. In general, the coverage of the light beams of the headlamps is moved to the right or to the left depending on the angle of the steering wheel of the vehicle and/or the speed of the vehicle in order to more brightly illuminate the road scene in the direction in which the vehicle is heading. In DBL systems, the light beams are generally formed by light-emitting diodes (also called LEDs), which are positioned in a line or so as to form a screen (i.e. in a number of rows and columns), and the brightness of which may vary. Thus, with lighting generated by light-emitting diodes, the luminous flux emitted by the headlamp may vary and form a luminous-flux image the brightness of which differs from one region of the image to another. One example of such a luminous-flux image, also called a light map, has been shown in FIG. 1. The image of FIG. 1 corresponds to a luminous-flux image emitted by a headlamp when the vehicle is being driven in a straight line.

One current DBL technique consists in translating the luminous-flux image (for example the image of FIG. 1) to the right when the vehicle turns right or to the left when the vehicle turns left, so that the luminous flux is shifted to the right or left. Another current DBL technique consists in compressing one side of the luminous-flux image and decompressing the other side of said image so as to shift the luminous flux to the right or left.

Both these current techniques preserve the same luminous-flux image, which is shifted to the right or left. However, in certain circumstances, it may be advantageous to modify luminous intensity, for example so that the maximum luminous intensity is higher or, conversely, lower, and this is something that cannot be achieved simply by shifting the luminous-flux image to one side or the other.

Moreover, new regulations require that lighting to the right have specific characteristics and that lighting to the left have other specific characteristics, which characteristics current DBL techniques cannot generate.

SUMMARY OF THE INVENTION

In order to address the aforementioned problems due to the shift of the luminous-flux image to the right or left, and to comply with the new regulations, the applicant has developed a method for controlling bending light in which at least three different initial luminous-flux images are produced, from which intermediate luminous-flux images may be defined by applying a weighted average.

According to a first aspect, the invention relates to a method for controlling bending light generated by a vehicle lighting device emitting, toward a road scene, a luminous flux that varies depending on the movement of the vehicle, the method comprising the following steps:

a) determining at least three initial luminous-flux images, each initial luminous-flux image corresponding to emission of light by the lighting device in a predefined direction, d) when the vehicle is not following one of the predefined directions, determining an intermediate luminous-flux image to be emitted by the lighting device in an intermediate direction, by weighted averaging of two of the three initial luminous-flux images corresponding to the directions flanking the intermediate direction most closely; and e) projecting, onto the road scene, depending on the direction of movement of the vehicle, the initial or intermediate luminous-flux image.

This method allows a specific luminous-flux image to be determined for each direction taken by the vehicle between the leftmost direction and rightmost direction.

Advantageously, the three initial luminous-flux images comprise:

a left lateral initial luminous-flux image emitted by the lighting device toward the left of the vehicle, a right lateral initial luminous-flux image emitted by the lighting device toward the right of the vehicle, and a central initial luminous-flux image emitted by the lighting device toward the center of the vehicle.

With these three images, it is possible to determine a luminous-flux image intermediate between the left lateral initial image and the central initial image, for all vehicle directions between the leftmost direction and the central direction, and a luminous-flux image intermediate between the central initial image and the right lateral initial image, for all vehicle directions between the central direction and rightmost direction. Thus, a luminous-flux image adapted to any direction of movement of the vehicle may be projected onto the road, the direction of movement being able to be any direction contained in the range of possible directions between the maximum left turn angle and the maximum right turn angle permitted by the vehicle. The driver of the vehicle therefore sees a road scene that is illuminated optimally, constantly, throughout the movement and whatever the path of the vehicle.

By definition, a predetermined luminous-flux image corresponding to a predefined direction and/or one particular DBL angle is called the "initial image". By extension, a predefined direction is also called the "initial direction" and one particular DBL angle is also called the "initial DBL angle", as opposed to the DBL angle of the moving vehicle.

Apart from the features mentioned above in the preceding section, the method for controlling bending light according to one aspect of the invention may have one or more of the following complementary features, which may be implemented individually or in any technically feasible combination:

it comprises, prior to operation d) of determining an intermediate luminous-flux image:

a first operation c1) of translating a first initial luminous-flux image corresponding to one of the two directions flanking the intermediate direction most closely, and a second operation c2) of translating a second initial luminous-flux image corresponding to the other of the directions flanking the intermediate direction most closely, the first translating operation c1) being carried out in a direction opposite to that of the second translating operation c2);

it comprises an operation b) of determining a proportional position of the intermediate image between a first initial luminous-flux image and a second initial luminous-flux image, a positioning coefficient being deduced from said proportional position;

the positioning coefficient is applied in operations c1) and c2) of translating the first and second initial luminous-flux images;

the positioning coefficient is applied in operation d) of weighted averaging of the two initial luminous-flux images.

According to a second aspect, the invention relates to a vehicle bending-light lighting device emitting a luminous flux to illuminate a road scene depending on the movement of said vehicle, characterized in that it implements the method such as defined above.

Advantageously, this lighting device comprises a plurality of light-emitting diodes, aligned or taking the form of a screen, the luminous power of which varies so as to generate at least three initial luminous-flux images.

BRIEF DESCRIPTION OF DRAWINGS

Other advantages and features of the invention will become apparent on reading the following description, which is illustrated by the figures, in which.

DETAILED DESCRIPTION OF THE INVENTION

One example of embodiment of a method for controlling bending light generated by a vehicle headlamp is described in detail below, with reference to the appended drawings. This example illustrates the features and advantages of the invention. However, it will be recalled that the invention is not limited to this example.

In the figures, identical elements have been identified using identical reference signs. For the sake of the readability of the figures, the elements in the figures have not been shown to scale.

Figure 1:
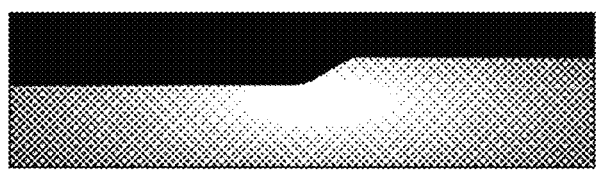
FIG. 1, which has already been described, shows one example of a luminous-flux image conventionally used in DBL systems.
Figure 2:
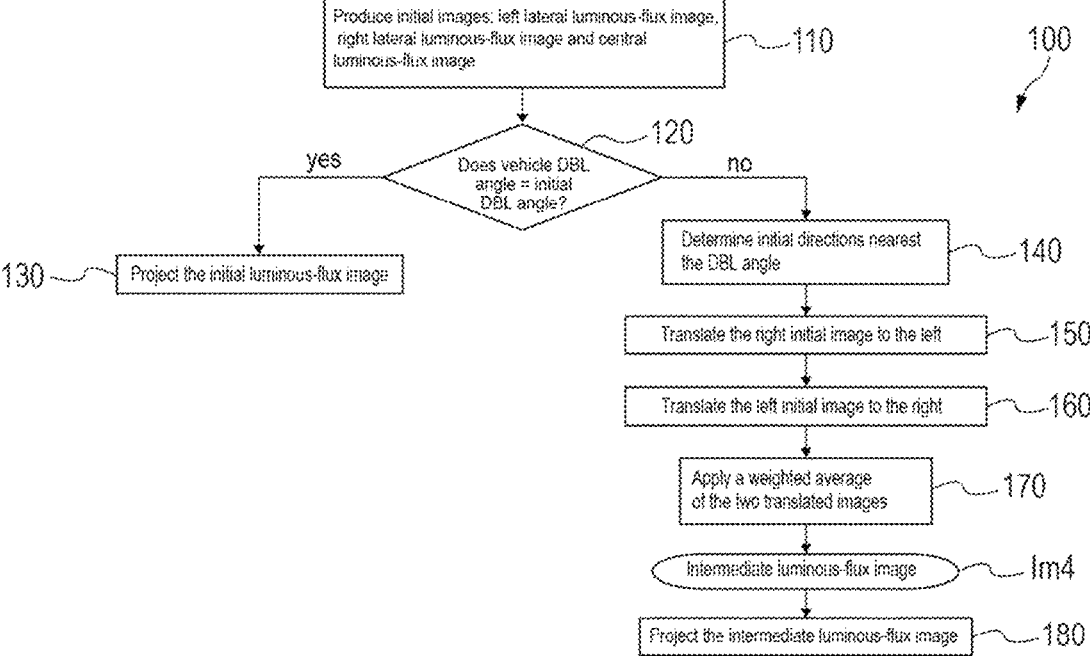
FIG. 2 shows, in the form of a flowchart, one example of the various operations of the method according to the invention.

One example of the method 100 according to the invention is shown, in flowchart form, in FIG. 2. This method comprises a first operation 110 of producing the initial luminous-flux images. These initial luminous-flux images or, more simply, initial images, are the luminous-flux images emitted by the headlamps of the vehicle when said vehicle is moving in predefined directions. The initial images are at least three in number and correspond to three different predefined directions.

Figure 3:
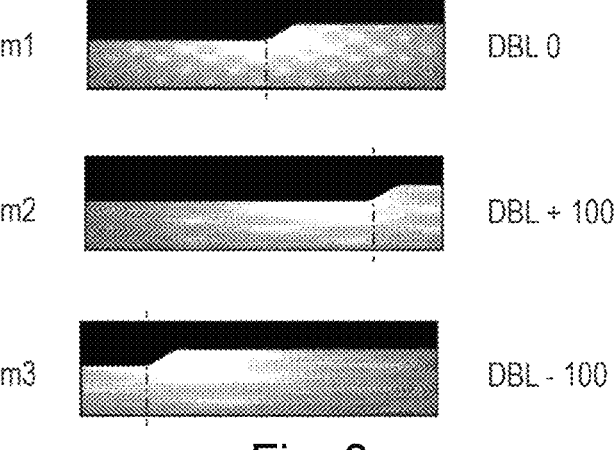
FIG. 3 shows examples of initial luminous-flux images produced in the method according to the invention.

Examples of three initial images have been shown in FIG. 3. In the example of FIG. 3, the initial image Im1 is one example of a luminous flux generated for a vehicle driving in a straight line, i.e. following a rectilinear path. When the vehicle is driving in a straight line, the DBL angle corresponding to the direction followed by the vehicle is equal to 0. The initial image Im1 for a vehicle moving in a straight line is called the central initial image.

In the example of FIG. 3, the initial image Im1 is one example of a luminous flux generated for a vehicle turning maximally to the right, i.e. following a curved path oriented maximally to the right. When the vehicle is turning fully to the right, i.e. when the steering wheel angle is maximally to the right, the DBL angle is considered to be equal to +100. The initial image Im2 for a vehicle turning fully to the right is called the right lateral initial image.

In the example of FIG. 3, the initial image Im3 is one example of a luminous flux generated for a vehicle turning maximally to the left, i.e. following a curved path oriented maximally to the left. When the vehicle is turning fully to the left, i.e. when the steering wheel angle is maximally to the left, the DBL angle is considered to be equal to −100. The initial image Im3 for a vehicle turning fully to the left is called the left lateral initial image.

The three initial images Im1, Im2 and Im3 are predefined images that meet regulatory requirements. These three images Im1, Im2, Im3 are determined by the manufacturer of the lighting device and implemented in said lighting device before the vehicle is put into service or when said lighting device is updated by a professional.

The minimum number of initial images with which the method of the invention can be implemented is three. The number of initial images may be greater than three, and for example equal to five. When there are three initial images, these initial images preferably comprise the left lateral initial image Im3, the right lateral initial image Im2 and the central initial image Im1. When more than three initial images are installed in the lighting device, then the two images supplementary to Im1, Im2 and Im3 may be images inset between the central initial image Im1 and the left and right lateral initial images Im3 and Im2, respectively, for example corresponding to a DBL angle of +50 and −50. Regardless of the number of initial images, the method 100 will be applied in the same way as explained below.

After production of the initial images Im1, Im2, Im3, the method 100, in test 120, checks whether the vehicle DBL angle corresponds to one of the predefined initial directions. In other words, the method 100 checks whether the vehicle DBL angle corresponds to one of the initial DBL angles, for which an initial image has been defined. If such is the case, then the method continues with operation 130 in which the initial luminous-flux image corresponding to the initial DBL angle is projected onto the road scene. For example, if it is determined in test 120 that the vehicle DBL angle corresponds to the initial DBL angle +100, then initial image Im2 is projected onto the road.

In contrast, if the vehicle DBL angle does not correspond to one of the initial DBL angles, then the method continues to step 140 of determining the initial directions that flank the vehicle DBL angle most closely. In other words, in step 140, it is determined which initial DBL angles flank the DBL angle of the moving vehicle. For example, if the vehicle DBL angle is equal to +40, then the initial DBL angles flanking this DBL angle +40 are the DBL angle +100 and the DBL angle 0. According to another example, if the vehicle DBL angle is equal to −60, then the initial DBL angles flanking this DBL angle −60 are the DBL angle −100 and the DBL angle 0.

The method 100 then continues to steps 150 and 160 of translating the initial images. In step 150, the initial image corresponding to the right initial DBL angle—i.e. the DBL angle the value of which is greater than the vehicle DBL angle (flanking on the right the vehicle DBL angle)—is translated to the left. In step 160, the initial image corresponding to the left initial DBL angle—i.e. the DBL angle the value of which is less than the vehicle DBL angle (flanking on the left the vehicle DBL angle)—is translated to the right. For example, for a vehicle DBL angle equal to +40, the right lateral initial image Im2 (corresponding to the DBL angle +100) is translated to the left and the central initial image Im1 (corresponding to the initial DBL angle 0) is translated to the right. According to another example, where the vehicle DBL angle is equal to −60, the left lateral initial image Im3 (corresponding to the DBL angle −100) is translated to the right and the central initial image Im1 (corresponding to the initial DBL angle 0) is translated to the left.

The translating steps 150 and 160 are preferably applied taking into account a positioning coefficient determined from the proportional position of the vehicle DBL angle with respect to the nearest initial DBL angles. Specifically, step 140 of the method may incorporate an operation of determining the proportional position of the intermediate image between the first initial image, for example the initial image corresponding to the right initial DBL angle, and the second initial image, for example the initial image corresponding to the left initial DBL angle. A positioning coefficient is then deduced from this proportional position.

For example, for a vehicle DBL angle equal to +40, the positioning coefficient is 40/60; the central initial image Im1 is translated by 40 to the right and the right lateral initial image Im2 is translated by 60 to the left, 40 and 60 being proportional numbers, for example given in percentages or in numbers of pixels. In another example where the vehicle DBL angle is equal to −60, the positioning coefficient is 60/40; the central initial image Im1 is translated by 60 to the left and the left lateral initial image Im3 is translated by 40 to the right.

Following steps 150 and 160, the two initial images, for example Im1/Im2 or Im1/Im3, corresponding to the initial DBL angles nearest the vehicle DBL angle, are superposed.

The method 100 continues to step 170, in which a weighted average of the two translated initial images is applied. The operation of averaging these two initial images is carried out by weighting each of the two images depending on the positioning coefficient used in steps 150 and 160. For example, for a vehicle DBL angle equal to +40, the weighting used for the central initial image Im1 is 40% and the weighting used for the right lateral initial image Im2 is 60%. In the example where the vehicle DBL angle is equal to −60, the weighting of the central initial image Im1 is 60% and the weighting of the left lateral initial image Im3 is 40%. In an example where the vehicle DBL angle is equal to −20, the weighting of the central initial image Im1 is 20% and the weighting of the left lateral initial image Im3 is 80%.

The operation of averaging the two translated initial images is carried out, for example, pixel by pixel or by any other image-averaging technique known in the field of image processing.

The image Im4 obtained after applying the weighted average to the two translated initial images is called the intermediate luminous-flux image, or simply the intermediate image. This intermediate image Im4 is then projected, in step 180, onto the road.

A number of examples of initial and/or intermediate images have been shown in FIGS. 4 to 9. In all these examples, the number of initial images is three:

the initial image referenced A is the left lateral initial image, corresponding to the initial DBL angle −100 (or leftmost DBL angle);

the initial image referenced B is the central initial image, corresponding to the initial DBL angle 0, i.e. the central DBL angle;

the initial image referenced C is the right lateral initial image, corresponding to the initial DBL angle +100 (or rightmost DBL angle); and the image referenced D is the resulting image (i.e. the initial image or the intermediate image depending on the case) that will be projected onto the road.

In the examples of FIGS. 4 to 9, the numbers in pixels (px) correspond to the positioning coefficients applied in the translation of the initial images to be translated and the numbers in percent (%) correspond to the weighting applied during averaging of the translated initial images. The initial images A, B and C of FIGS. 4 to 9 that are not associated with a number of pixels are initial images not used to determine the image D to be projected.

Figures 4, 5:
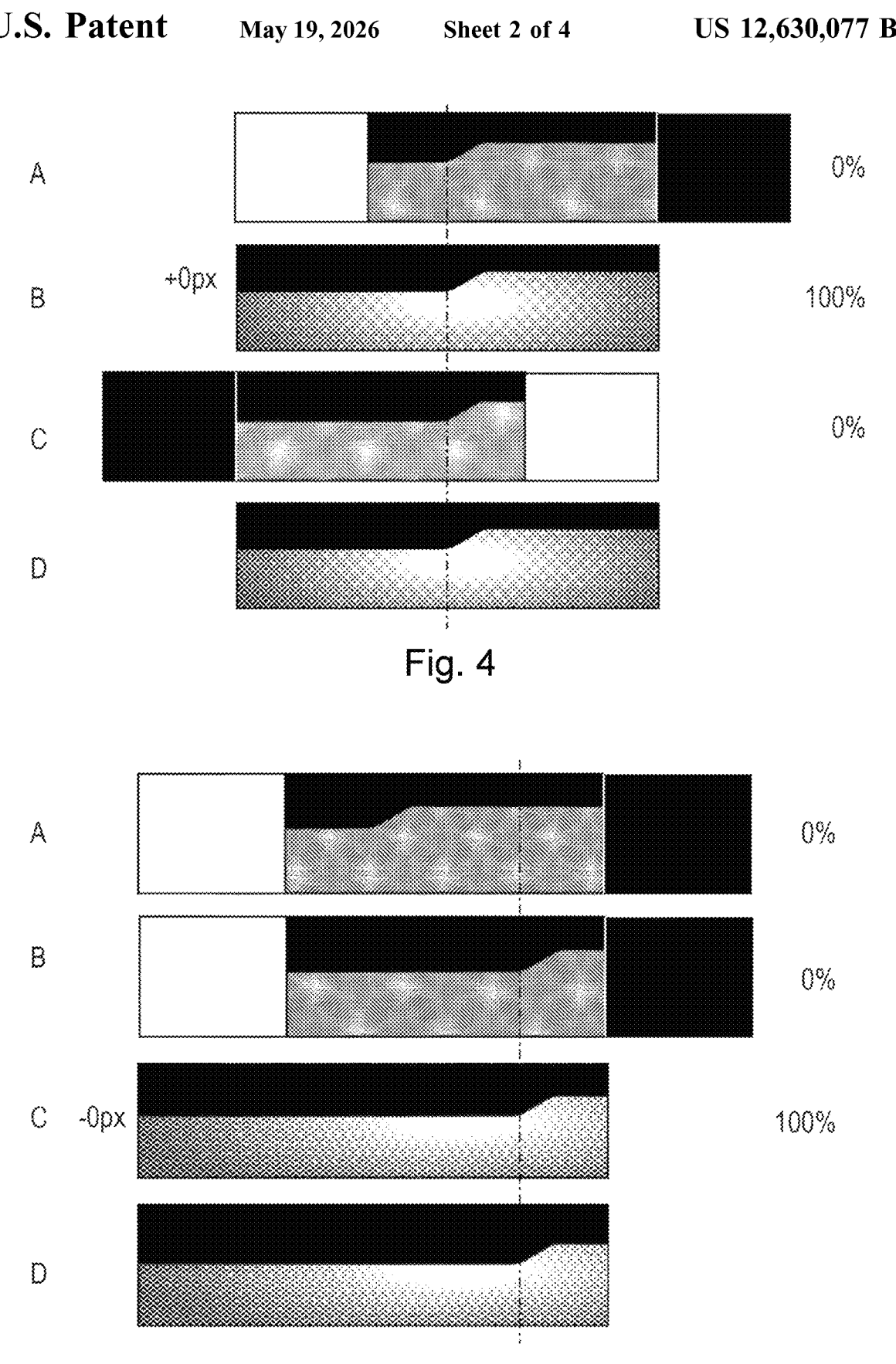
FIG. 4 shows various luminous-flux images used in the method according to the invention when the DBL angle is 0°.
FIG. 5 shows various luminous-flux images used in the method according to the invention when the DBL angle is 100°.

In the example of FIG. 4, the vehicle DBL angle is the initial DBL angle 0. The image D to be projected is therefore the central initial image (image B).

In the example of FIG. 5, the vehicle DBL angle is the initial DBL angle +100. The image D to be projected is therefore the right lateral initial image (image C).

Figures 6, 7:
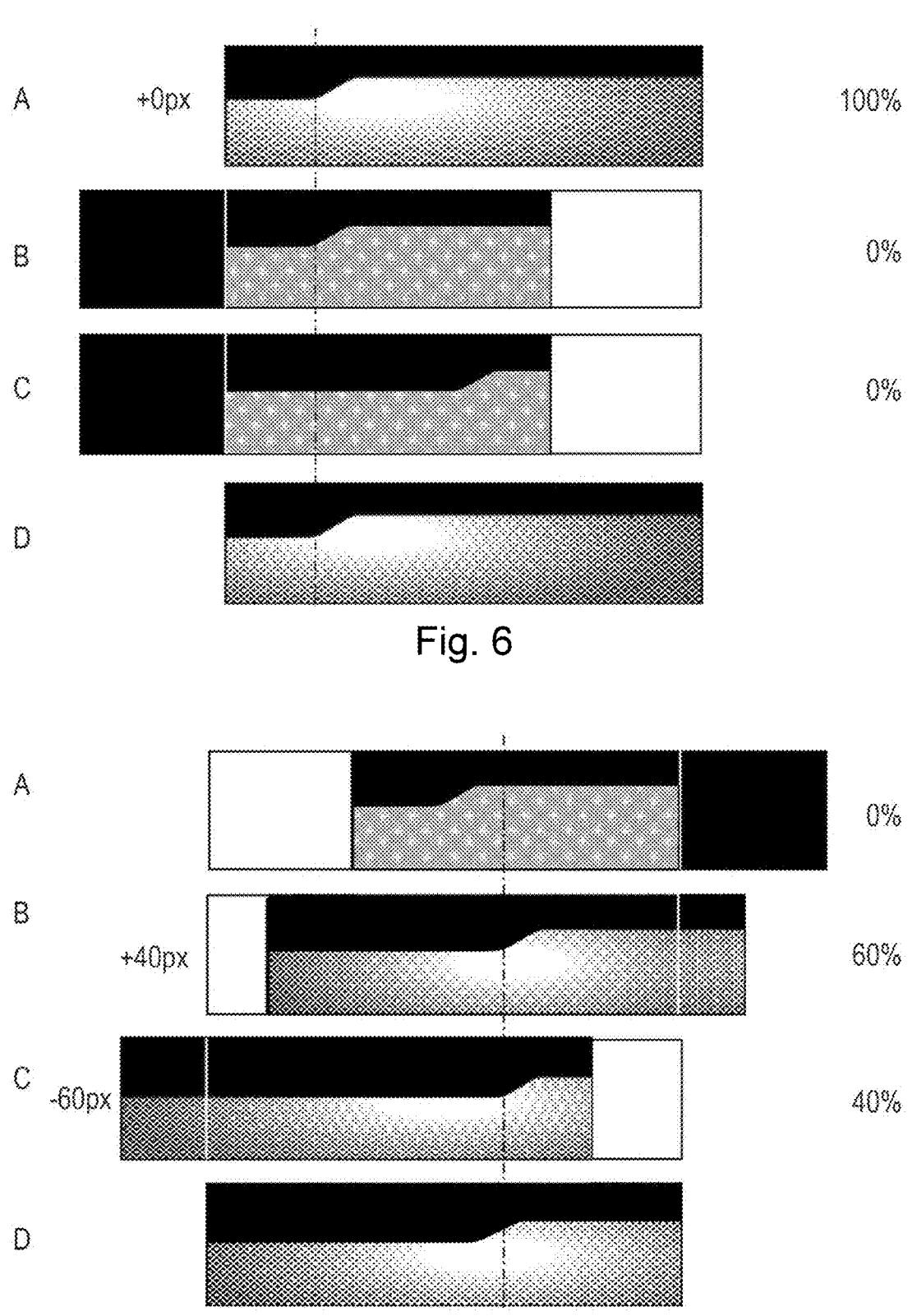
FIG. 6 shows various luminous-flux images used in the method according to the invention when the DBL angle is −100°.
FIG. 7 shows various luminous-flux images used in the method according to the invention when the DBL angle is +40°.

In the example of FIG. 6, the vehicle DBL angle is the initial DBL angle −100. The image D to be projected is therefore the left lateral initial image (image A).

In the example of FIG. 7, the vehicle DBL angle is the intermediate angle +40. The initial images to be translated are therefore the central initial image (image B), which is translated by +40 px (i.e. 40 px to the right), and the right lateral initial image (image C), which is translated by −60 px (i.e. 60 px to the left). The image D to be projected is therefore the intermediate image obtained by averaging image B with a weighting of 60% and image C with a weighting of 40%.

Figures 8, 9:
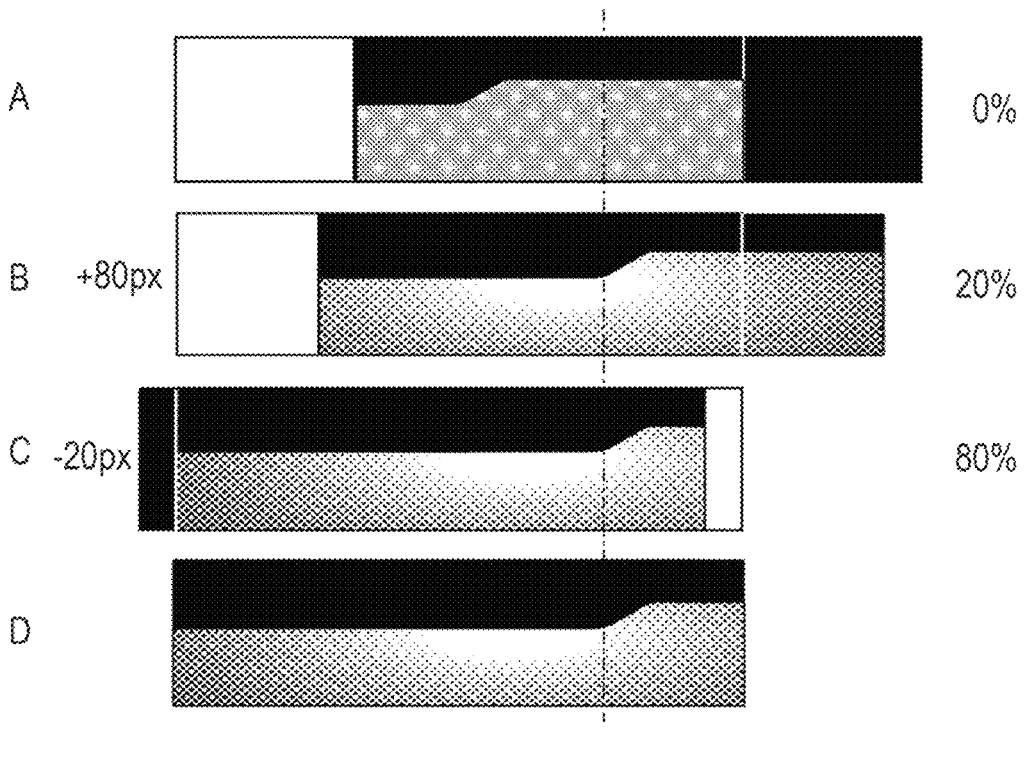
FIG. 8 shows various luminous-flux images used in the method according to the invention when the DBL angle is +80°.
FIG. 9 shows various luminous-flux images used in the method according to the invention when the DBL angle is −60°.

In the example of FIG. 8, the vehicle DBL angle is the intermediate angle +80. The initial images to be translated are therefore the central initial image (image B), which is translated by +80 px (i.e. 80 px to the right), and the right lateral initial image (image C), which is translated by −20 px (i.e. 20 px to the left). The image D to be projected is therefore the intermediate image obtained by averaging image B with a weighting of 20% and image C with a weighting of 80%.

In the example of FIG. 9, the vehicle DBL angle is the intermediate angle −60. The initial images to be translated are therefore the left lateral initial image (image A), which is translated by +40 px (i.e. 40 px to the right), and the central initial image (image B), which is translated by −60 px (i.e. 60 px to the left). The image D to be projected is therefore the intermediate image obtained by averaging image A with a weighting of 60% and image B with a weighting of 40%.

The method 100 was described above by way of examples in which three initial images Im1, Im2 and Im3 were defined. It will be understood that the same method may be applied in the same way regardless of the number of initial images defined. If more than three initial images are defined, the initial images to be translated and averaged are the two initial images corresponding to the two initial DBL angles flanking the vehicle DBL angle most closely. For example, if five initial images were defined for initial DBL angles of +0, +50, +100, −50 and −100, and if the vehicle DBL angle is +20, then the initial images that will be translated and averaged are the initial image corresponding to the initial DBL angle +0 and the initial image corresponding to the initial DBL angle +50.

The method such as described above may be implemented in many types of lighting devices such as, for example, matrix lighting devices, scanned-laser lighting devices, lighting devices based on an LED screen or micro-LED screen, etc., provided that the luminous power emitted is able to vary. For example, in an LED-based lighting device, the power of each LED is controlled, for example by a control unit, and hence various initial luminous-flux images may be generated for the various initial DBL angles chosen.

Although described by way of a certain number of examples, variants and embodiments, the method for controlling bending light according to the invention comprises various variants, modifications and improvements which seem obvious to those skilled in the art, it being understood that these variants, modifications and improvements form part of the scope of the invention.

What is claimed is:

1. A method for controlling bending light generated by a vehicle lighting device emitting, toward a road scene, a luminous flux that varies depending on the movement of the vehicle, the method comprising:

determining at least three initial luminous-flux images, each initial luminous-flux image corresponding to emission of light by the lighting device in a predefined direction, when the vehicle is not following one of the predefined directions, determining an intermediate luminous-flux image to be emitted by the lighting device in an intermediate direction, by weighted averaging of two of the three initial luminous-flux images corresponding to the directions flanking the intermediate direction most closely; and projecting, onto the road scene, depending on the direction of movement of the vehicle, the initial or intermediate luminous-flux image.

2. The method as claimed in claim 1, wherein the three initial luminous-flux images includes:

a left lateral initial luminous-flux image emitted by the lighting device toward the left of the vehicle, a right lateral initial luminous-flux image emitted by the lighting device toward the right of the vehicle, and a central initial luminous-flux image emitted by the lighting device toward the center of the vehicle.

3. The method as claimed in claim 1, further comprising:

a first operation of translating a first initial luminous-flux image corresponding to one of the two directions flanking the intermediate direction most closely, and a second operation of translating a second initial luminous-flux image corresponding to the other of the directions flanking the intermediate direction most closely, the first translating operation being carried out in a direction opposite to that of the second translating operation.

4. The method as claimed in claim 3, further comprising determining a proportional position of the intermediate image between a first initial luminous-flux image and a second initial luminous-flux image, a positioning coefficient being deduced from the proportional position.

5. The method as claimed in claim 4, wherein the positioning coefficient is applied in operations of translating the first and second initial luminous-flux images.

6. The method as claimed in claim 4, wherein the positioning coefficient is applied in operation of weighted averaging of the two initial luminous-flux images.

7. A vehicle bending-light lighting device emitting a luminous flux to illuminate a road scene depending on the movement of the vehicle, the device configured to:

determine at least three initial luminous-flux images, each initial luminous-flux image corresponding to emission of light by the lighting device in a predefined direction, when the vehicle is not following one of the predefined directions, determining an intermediate luminous-flux image to be emitted by the lighting device in an intermediate direction, by weighted averaging of two of the three initial luminous-flux images corresponding to the directions flanking the intermediate direction most closely; and project, onto the road scene, depending on the direction of movement of the vehicle, the initial or intermediate luminous-flux image.

8. The lighting device as claimed in claim 7, further comprising a plurality of light-emitting diodes, aligned or taking the form of a screen, the luminous power of which varies so as to generate at least three initial luminous-flux images.

\* \* \* \* \*